US00RE34758E

United States Patent [19]

Farley et al.

[11] E Patent Number: Re. 34,758

[45] Reissued Date of Patent: Oct. 18, 1994

[54] TRAVELLING DISC VALVE APPARATUS

[75] Inventors: David L. Farley, Lafayette, La.; Kent T. Fink, Glen Ellyn, Ill.

[73] Assignee: Osca, Lafayette, La.

[21] Appl. No.: 16,433

[22] Filed: Feb. 11, 1993

Related U.S. Patent Documents

Reissue of:

[64] Patent No.: 5,137,088
Issued: Aug. 11, 1992
Appl. No.: 693,679
Filed: Apr. 30, 1991

[51] Int. Cl.[5] ..... E21B 34/00

[52] U.S. Cl. ..... 166/319; 166/318

[58] Field of Search ..... 166/317-321, 166/325, 332, 373, 386

[56] References Cited

U.S. PATENT DOCUMENTS

| | | | |
|---|---|---|---|
| 2,545,504 | 3/1951 | Villafane | 166/4 |
| 2,565,731 | 8/1951 | Johnston | 164/0.3 |
| 2,626,177 | 1/1953 | Maxwell et al. | 294/86 |
| 2,855,943 | 10/1958 | Moller et al. | 137/70 |
| 3,024,846 | 3/1962 | Gage | 166/226 |
| 3,599,713 | 8/1971 | Jenkins | 166/244 |
| 3,831,680 | 8/1974 | Edwards et al. | 166/311 |
| 4,512,406 | 4/1985 | Vann et al. | 166/318 X |
| 4,651,827 | 3/1987 | Helderle | 166/317 |
| 4,658,902 | 4/1987 | Wesson et al. | 166/319 X |
| 4,691,775 | 9/1987 | Lustig et al. | 166/317 |
| 4,846,281 | 7/1989 | Clary et al. | 166/317 X |
| 4,907,655 | 3/1990 | Hromas et al. | 166/317 X |
| 4,911,242 | 3/1990 | Hromas et al. | 166/319 X |
| 4,957,167 | 9/1990 | Schultz | 166/319 |

*Primary Examiner*—Michael Powell Buiz
*Attorney, Agent, or Firm*—Pravel, Hewitt, Kimball & Krieger

[57] ABSTRACT

A travelling disc valve assembly, comprising a length of tubing lowered down a cased wellbore; a crossover tool secured to the lower end of the length of tubing; a length of wash pipe secured to the lower end of the crossover tool; a disc valve assembly secured to the wash pipe and positioned to a lower circulation position in the well bore; a disc valve secured in a bore of the assembly; in the upper, portion of the assembly for shearing off the connection between the wash pipe and the disc valve assembly, when the disc valve assembly is in an upper position, providing to prevent fluid from flowing into the formation below the disc valve and to prevent production flow to the surface; and a to rupture the disc valve at a predetermined time so that the production within the formation is allowed to flow through the assembly bore to the surface.

20 Claims, 10 Drawing Sheets

TRAVELLING DISC VALVE APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The apparatus of the present invention relates to downhole valves. More particularly, the present invention relates to a disc valve, constructed of a breakable material, such as glass, positioned in the flowbore of a tubing string that prevents flow of fluid through the bore from either direction. When flow is desired, the breakable disc is ruptured, and the flow is allowed to commence within the bore.

2. General Background

In this general process for drilling and produces of oil and gas wells, at that point in the process where a hydrocarbon formation has been located in a particular depth, normally an exterior casing would be lowered down, the borehole through the area of production, known as the production zone. The exterior casing is perforated with the use of a perforating gun or the like. Using electric wireline and setting tools, or some other means, a permanent type packer, referred to as a "sump packer" is usually set below the perforations. Subsequently, an internal tubing string, together with sand screen and blank pipe, packer and packer extension, hydraulic setting tool, cross-over tool, and wash pipe, are positioned within the exterior casing to engage with the "sump packer". The annulus between the sand screen and the exterior perforated casing is packed off, utilizing certain procedures. This packing off is necessary so that the interior tubing would be utilized to carry the recovered hydrocarbons to the surface. The area around the perforations is prepared, so that the flow of hydrocarbons may commence.

For example, the well must be gravel packed, so that the flow of sand or the like out of the formation is prevented during recovery of the hydrocarbons. The present invention would be utilized following the gravel packing procedure, with the assignee company, Completion Services, Inc., would designate as the "Complete Gravel Pack," which would include a hydraulic setting tool and crossover being run into the well with the required sandscreen and blank pipe. The packer assembly would be seated using pump pressure applied to the tubing. After is it seated, the crossover valve may be opened and closed. With the crossover valve closed, the packer may be pressure tested by pumping down the casing. Fluid may be pumped into the formation to establish injection rate. Also, the formation may be acidized, if necessary. With the crossover valve open, sand slurry may be circulated to place sand outside of the screen and into the formation until adequate gravel pack is obtained. After removal of the setting tool and crossover, a production seal assembly is run in for production of the zone.

After gravel packing is complete, oftentimes the well may not necessarily be pressure balanced. The formation, under these conditions, may tend to absorb the well fluid into the production zone or the fluid in the zone may tend to flow into the well. In either case, this could lead to unacceptable (a) loss of expensive well fluid (b) damage to the formation, (c) danger of a potential well blow-out or co-mingling of formation fluids. In the present state of the art, if there can be a prediction in which direction the pressure differential will exist within the well, a flapper valve can be utilized which would hold pressure in one direction only. However, flapper valves can be easily damaged, activated premature, leak or rupture at too low a pressure differential. Therefore, there is a need in the art for a valve which would prevent the movement of fluids within the well bore in either direction, and under varying degrees of pressure differential within the well.

There have been patents issued in the art which relate to valves in operation downhole, during the recovery of hydrocarbons during production, etc., the most pertinent being as follows:

| U.S. Pat. No. | TITLE | ISSUE DATE |
|---|---|---|
| 4,658,902 | "Surging Fluids Downhole In An Earth Borehole" | Apr. 21, 1987 |
| 4,651,827 | "Hydraulically Controlled Safety Valves For Incorporation In Production Tubes Of Hydrocarbon Production Wells" | Mar. 24, 1987 |
| 4,691,775 | "Isolation Valve With Frangible Flapper Element" | Sep. 8, 1987 |
| 3,831,680 | "Pressure Responsive Auxiliary Disc Valve And The Like For Well Cleaning, Testing And Other Operations" | Aug. 27, 1974 |
| 3,599,713 | "Method And Apparatus For Controlling The Filling Of Drill Pipe Or The Like With Mud During Lowering Thereof" | Aug. 17, 1971 |
| 3,024,846 | "Dual Completion Packer Tool" | Nov. 15, 1957 |
| 2,855,943 | "Circulation Port Assemblies For Tubing Or Well Pipe" | Oct. 14, 1958 |
| 2,626,177 | "Tool For Hydraulically Displacing Well Materials" | Jan. 20, 1953 |
| 2,565,731 | "Disk Perforator For Pipes In Wells" | Aug. 28, 1951 |
| 2,545,504 | "Completion Shoe" | Mar. 20, 1951 |

Other objects of the invention will be obvious to those skilled in the art from the following description of the invention.

SUMMARY OF THE PRESENT INVENTION

The apparatus of the present invention solves the problems in the art in a simple and straightforward manner. What is provided is a travelling disc valve apparatus, positionable within the bore of a tubing string, to control differential pressures from above or below the position of the valve. The valve is engaged to the wash pipe and used during gravel packing operation. When gravel packing is concluded, the valve is then placed in position by raising the wash pipe to the upper seal bore, latching the valve in position. The wash pipe is then sheared from the safety valve, and the valve is sealing fluid flow in either direction. Upon lowering of a tool on a wireline, the glass travelling disc valve is then ruptured, and production flow up the string is allowed to proceed.

Therefore, it is a principal object of the present invention to provide a travelling disc valve positioned in a tubing string to provide control of differential pressures from above or below the valve;

It is a further object of the present invention to provide a valve which can be positioned in varied locations within the tubing string, and effects a positive seal when latched into position;

It is a further object of the present invention to provide a disc valve which, prevents loss of contaminating fluids, and prevents loss of the expensive completion fluids involved in the completion of an oil or gas well; and It is still a further object of the present invention to provide a disc valve which is flexible in its use downhole, and eliminates the difficulties of spring activated metal to metal, or metal to o-ring seal valves, such as flapper valves.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1A:
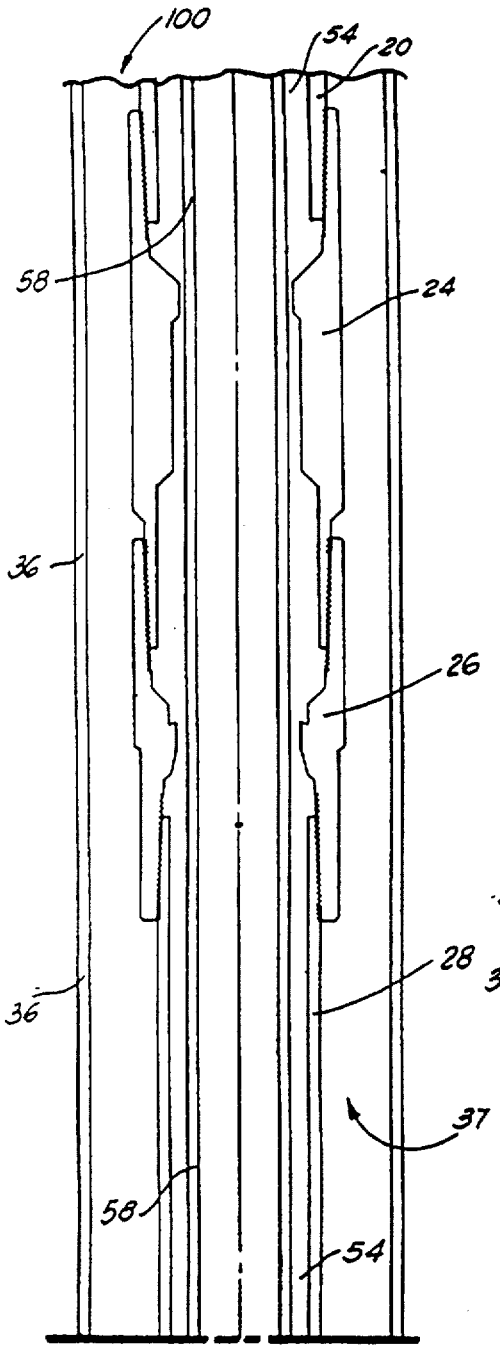
FIG. 1A through 1G illustrated cross-section views of isolated components making up the upper and lower sections of the lower circulation configuration utilizing the present invention.
Figure 2A:
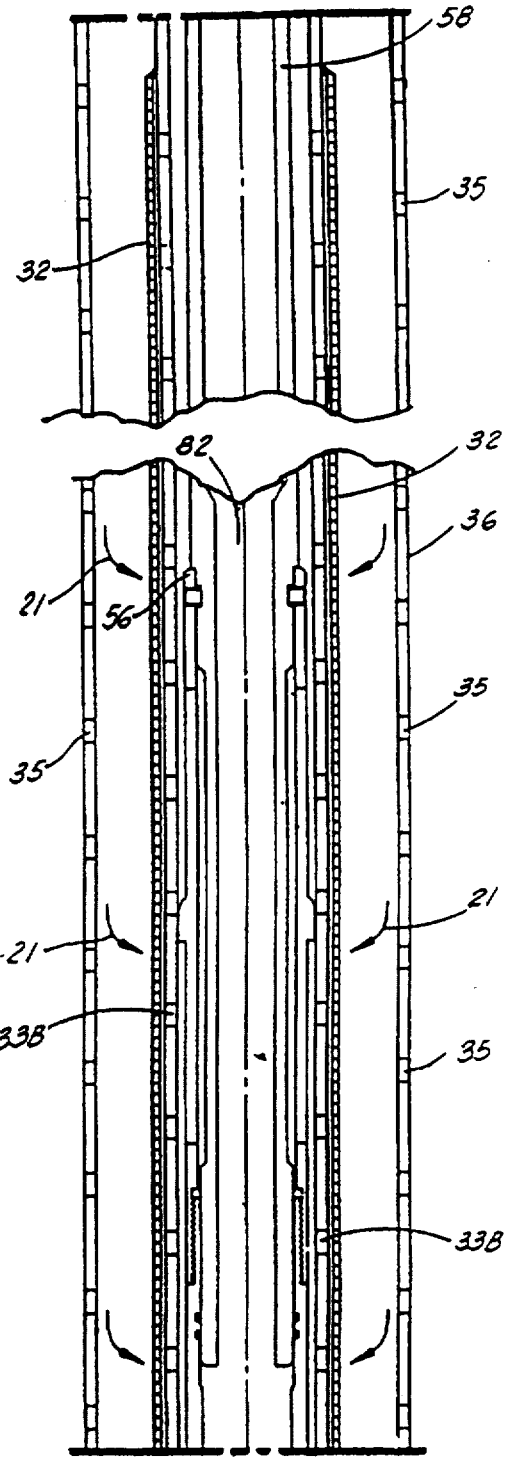
FIGS. 2A through 2D illustrate in cross-section views, the isolation components of the assembly during upper circulation following the raising of the top seal ring out of sealing engagement with the bottom seal bore.
Figure 1B:
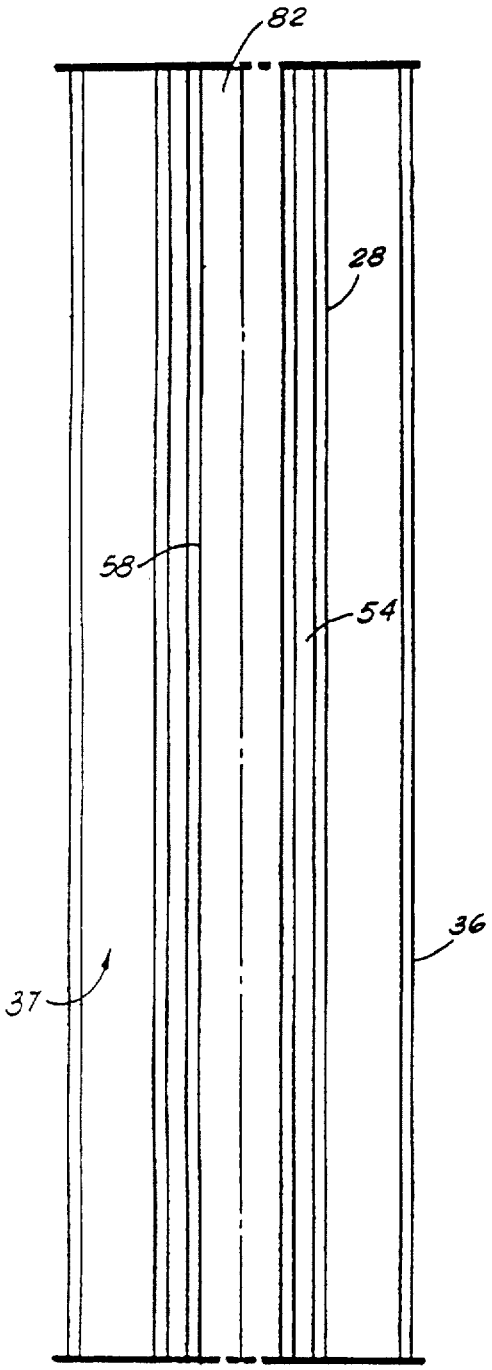
Figure 2B:
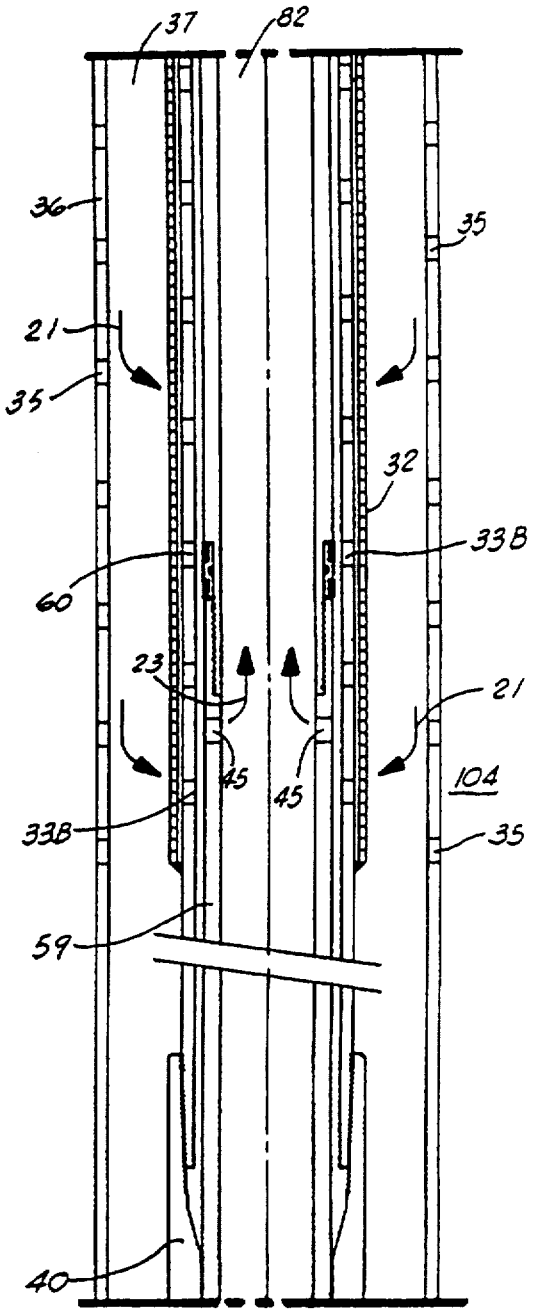
Figure 1C:
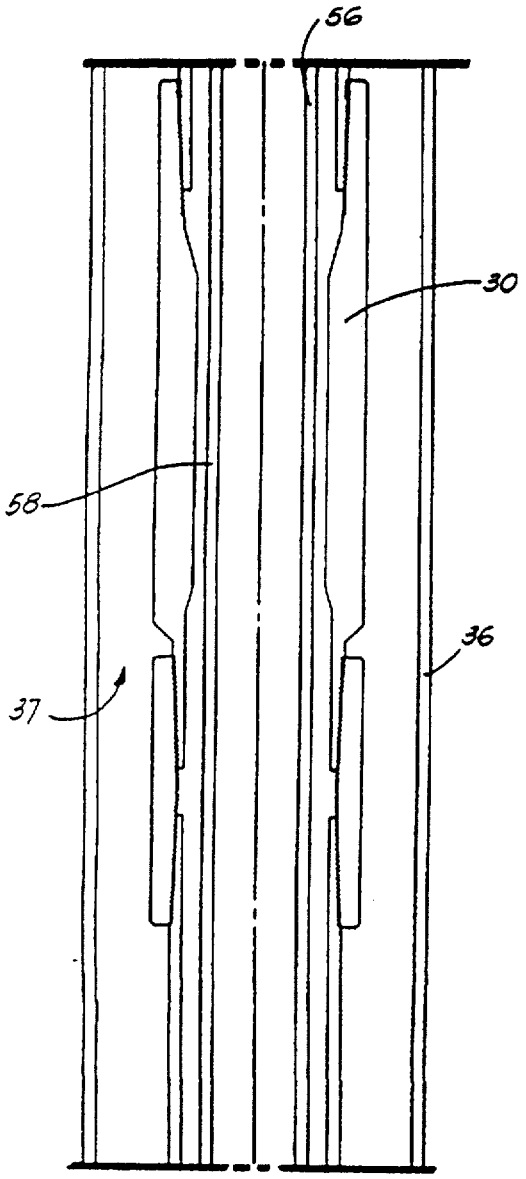
Figure 2C:
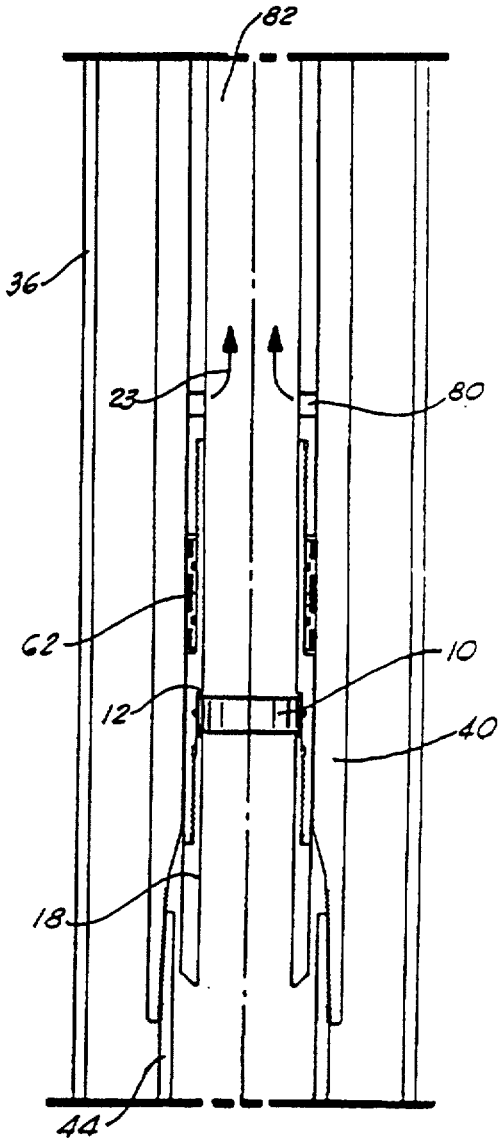

The apparatus of the present invention referred to as a travelling disc valve is illustrated in the figures by the numeral 10. As best seen in the drawings, the entire assembly housing the travelling disc valve assembly during lower circulation is shown in FIGS. 1A through 1G. The upper section of the assembly is illustrated in FIGS. 1A through 1D, and the lower section of the assembly illustrated in FIGS. 1E through 1G.

Figure 1D:
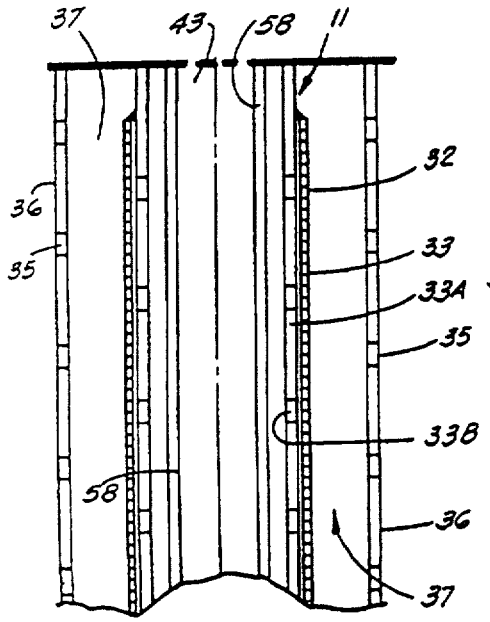
Figure 1E:
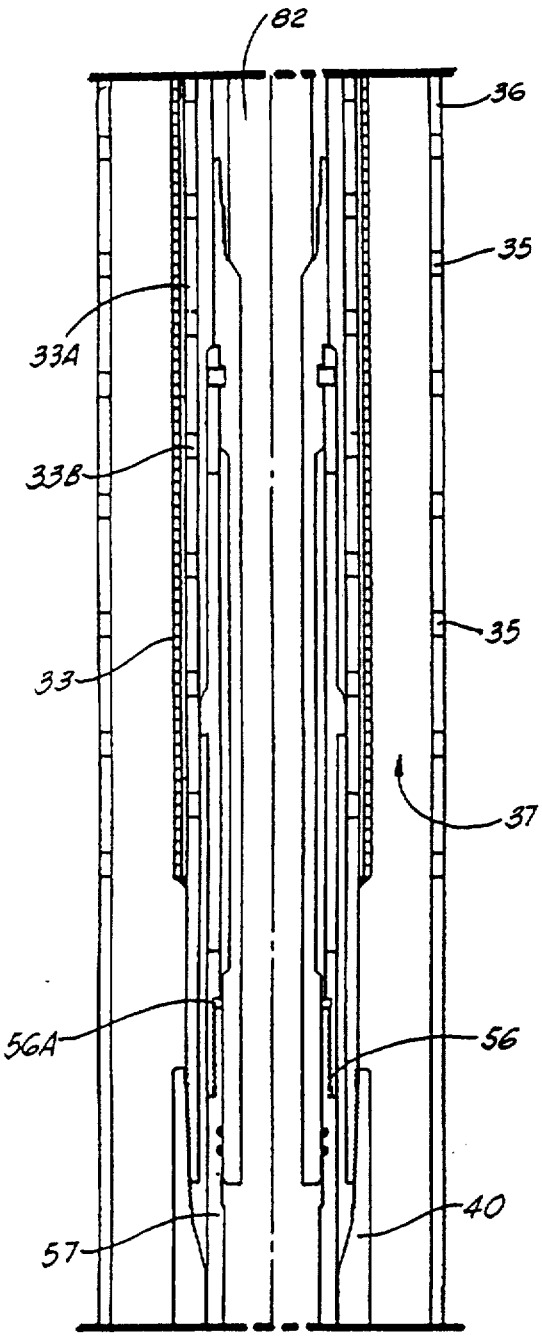
Figure 1F:
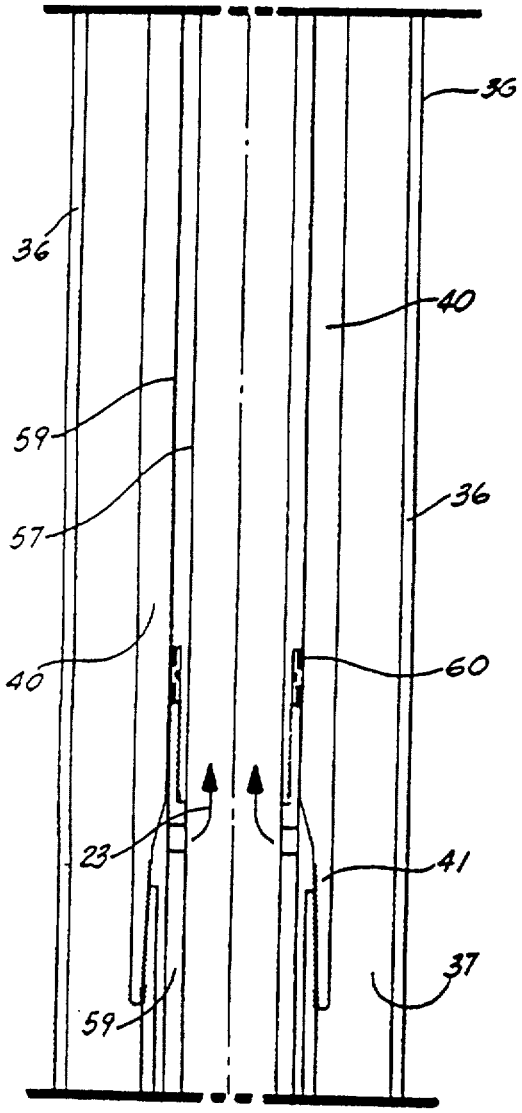
Figure 2F:
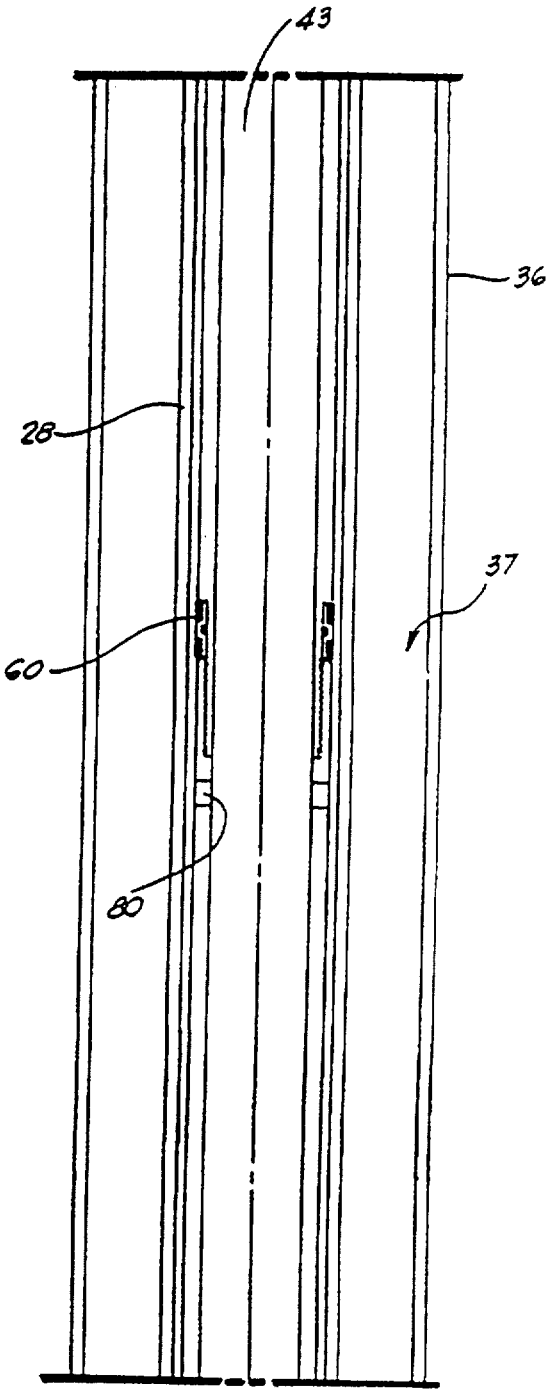
Figure 1G:
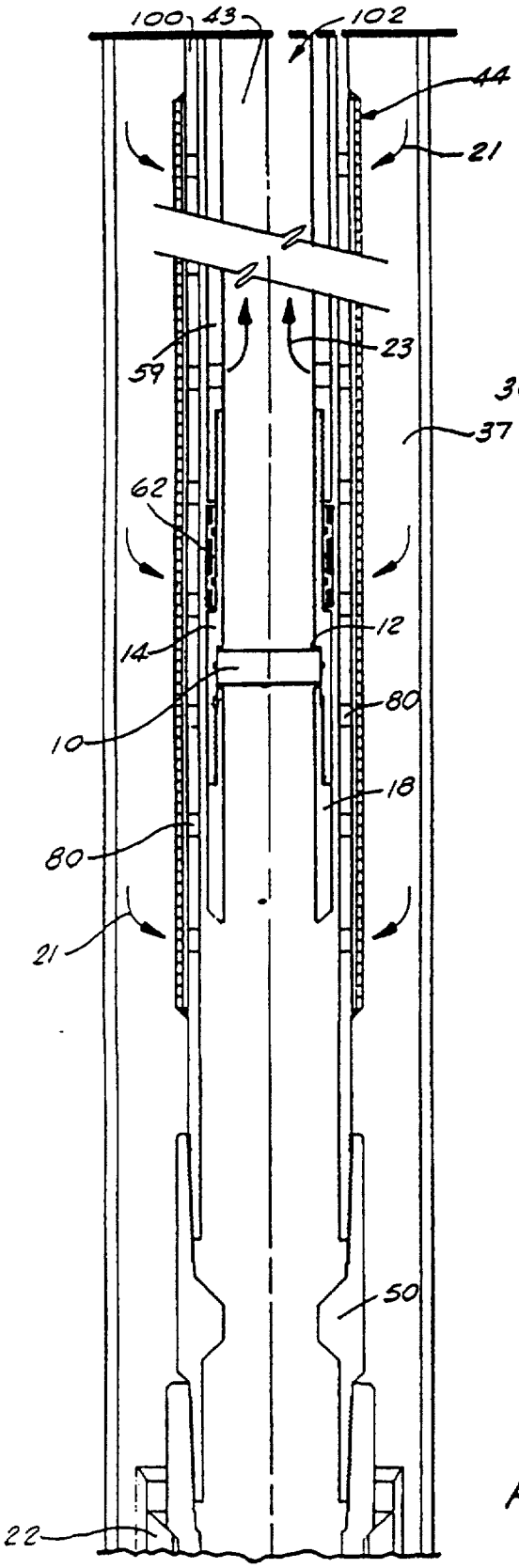
Figure 2G:
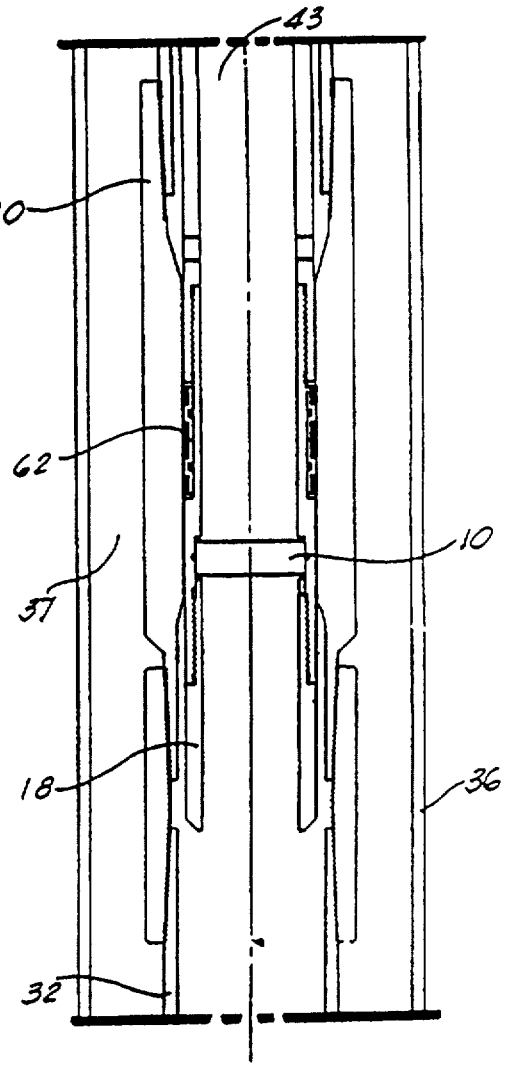
Figure 1H:
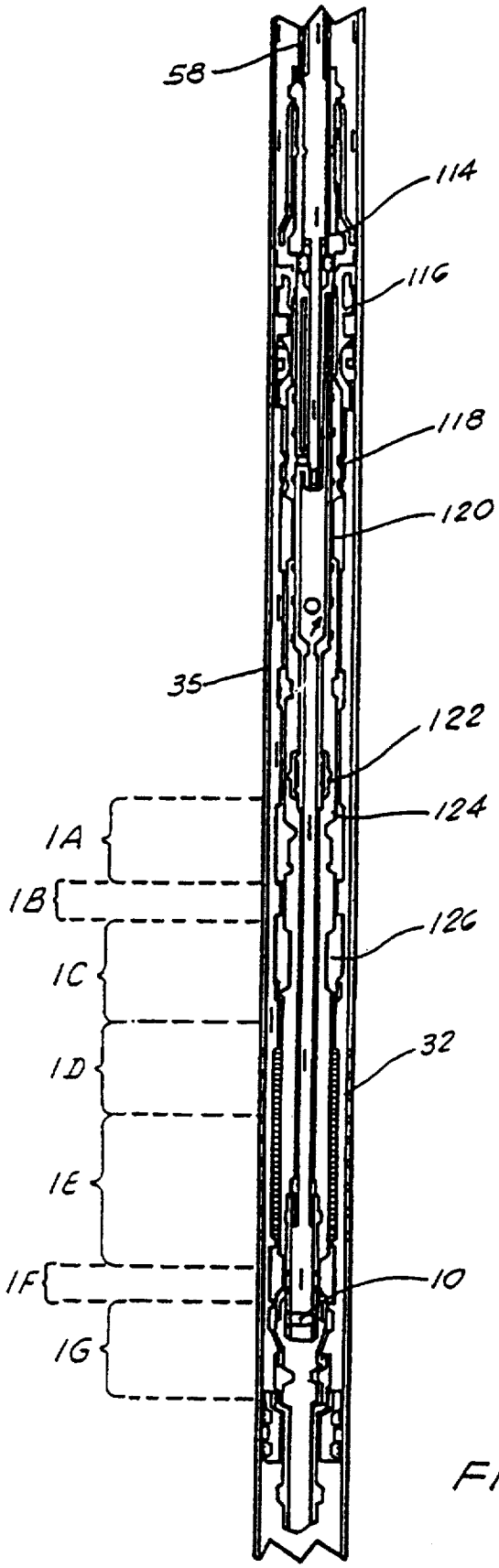
FIG. 1H is an overall view of the components of the assembly as illustrated in FIGS. 1A through 1G, including the components in the tubing string situation directly above the assembly components that are illustrated in FIG. 1H.

In FIG. 1H there is illustrated an overall composite view of the disc valve assembly as seen in its isolated components in FIGS. 1A through 1G, and the components in the tubing string positioned directly above the disc valve assembly. These would comprise upper setting tool and crossover assembly 114, with the compset packer 116 positioned directly below. Furthermore, there is illustrated the perforated extension 118, which is attached directly to the seal bore 120, which is positioned directly below the perforated extension 118. Furthermore, there is illustrated the indicator collet 122, and the no-go housing 124 for the disc valve 10. Directly below the no-go housing for the disc valve is a seal bore 126 for the disc valve 10, and thence the production screen 32 as illustrated in the isolated views, the top seal bore member 30, and thence the disc valve assembly 10 as will be discussed further.

As seen in FIG. 1G, travelling disc valve 10 comprises a solid piece of material, preferably glass, which may be of various thickness depending on the pressures downhole that may be encountered and various diameters depending on the size of the tubing in which the disc valve 10 is positioned. Disc 10 is positioned within a groove 12 in the wall of a collet member 14, as illustrated in FIG. 1G. Groove 12 is formed on its lower end of a circular end pice 18 threadably secured on the lower end of collet 14 which serves as the lower shoulder upon which the disc valve 10 rests in groove 12.

Turning now to the system in which travelling disc valve 10 functions, reference is made to FIG. 1A–1G, which comprise a series of isolated views of the system, extending from the upper packer extension 20 down to the lower most component, the sump packer 22. As seen in the FIGS. 1A through 1D, the packer extension 20 is threadably engaged to a to locator 24 which engages on its lowermost end a collet locator 26. The collet locator 26 interconnects to an elongated spacer 28, which, at its lower end engages the top seal bore member 30, to which bank tubing and the production screen 32 is suspended. Production screen 32, as illustrated in FIG. 1E would be a typical production screen having an outer screen layer 33, positioned around the screen support wall 33A. The support wall 33A would include a plurality of ports 33B so that production flow through the ports 35 in the wall of the production casing 36 into the annulus 37 of the production casing 36, would flow into the internal bore of the production screen and up to the surface as will be described further. As seen in FIG. 1D and 1E, when production is commenced the hydrocarbon flow would move through the perforations in the wall of casing 36, into the annulus between the wall of casing 36 and the production screen 32, and then to the surface through the bore in the production string.

As seen further in FIGS. 1E through 1G, the lower end of production screen 32 would be connected to a bottom seal bore 40, for connecting to, at its lower end 41, a second screen, or a telltale screen 44, which would be connected to a bottom locator 50 and then to the lowest component, the sump packer 22, which would pack off the lowest most point of the assembly so that fluid or production flow could not pass that point during production.

As is illustrated in FIGS. 1A–1G, the components previously recited, referred collectively hereinafter as outer production assembly 100, further comprise a continuous internal bore 54 therethrough, in which there is housed the internal system for carrying the travelling disc valve 10, and will be referred to as the travelling disc valve assembly 102. Continuing to refer to FIGS. 1A through 1G, the assembly 102 would comprise an upper length of wash pipe 58 extending down the internal bore 54 of the outer assembly 100, and would extend and interconnect to a sheat joint 56 the lower end of which would interconnect to a collect 57. The outlet 57 would further include a first top seal ring 60 which would form a seal between the outer wall 59 of collet 57 and the inner wall of bottom seal bore member 40, to prevent fluid flow therebetween. Further, as seen in FIG. 1G, collet 57 would further interconnect to a spacer 59 which would in turn interconnect to second bottom seal rings 62 again for sealing against fluid flow as will be discussed further. Directly positioned below second bottom seal rings 62 traveling disc valve member 10, as discussed earlier. As seen in the FIGURES, during the process of lower circulation, the travelling disc valve 10 is positioned along the length of telltale screen 44, to prevent the travelling disc valve from interfering with lower or upper circulation.

Having discussed the components of the system, as illustrated in the Figures, a discussion will be had regarding the function of the traveling disc valve 10 in the system, which lends itself to the novelty of the valve 10. FIGS. 1A–1G comprise the series of figures showing the operation of the system and the location of the disc valve 10 during lower circulation. As illustrated in the Figures, the travelling disc valve 10 and related components have been positioned below the upper packer, not illustrated, with the crossover tool raised to the lower circulation position. While in this position, the sand slurry, following the packaging off process as discussed, is pumped down the tubing, through the crossover ports into the casing annulus 37 below the packer 20, as seen by arrows 21, between the outer casing 36 and the outer assembly 100. The sand slurry flow, would then enter the telltale screen 44, through the pluralty of prots 80 in the wall of the screen above the disc valve 10, up the bore 43 of the wash pipe 58 in the direction of Arrows 23, through the concentric passage 82 of the crossover tool and would continue to travel up the passage through the ports which would communicate with the casing annulus above the packer, not illustrated.

Figure 2D:
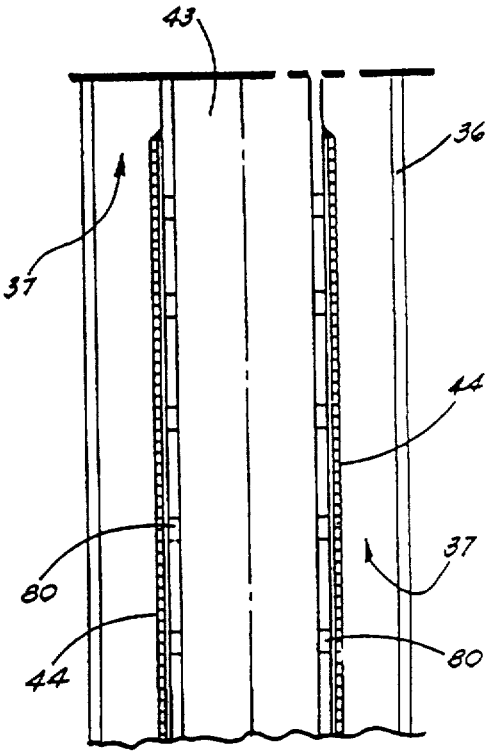
Figure 2E:
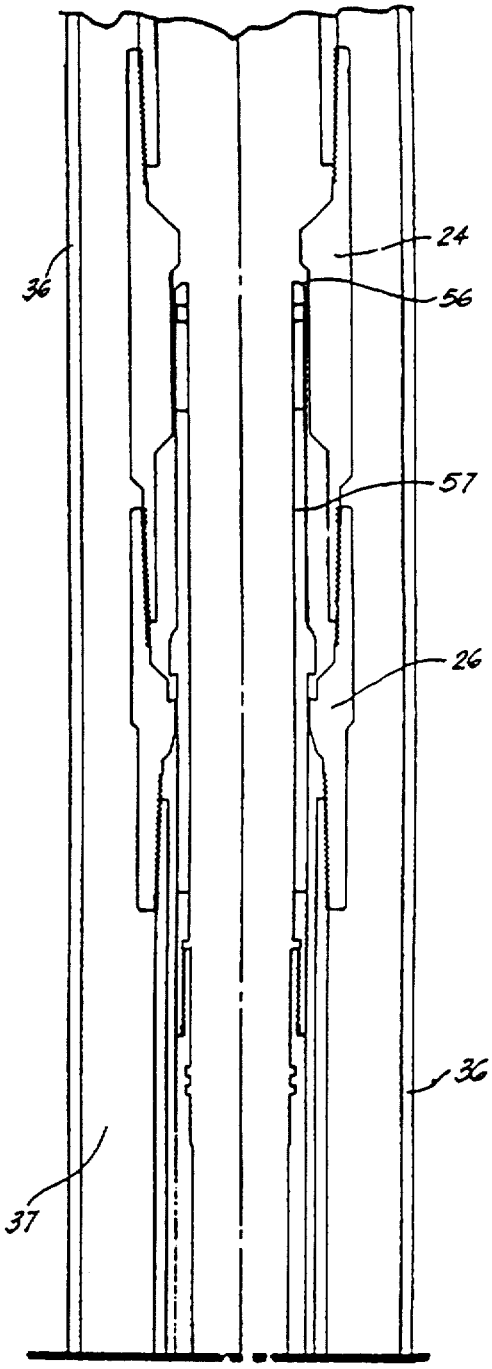
FIGS. 2E through 2G illustrate in cross-section views, the isolated components of the assembly further illustrating the upper section of the assembly after the wash pipe has been sheared and withdrawn from borehole and the disc valve is locked in position.

During the lower circulation process as described, the point at which sand has begun to accumulate against the ports in the telltale screen 44, would result in the retardation of the circulation of the fluid as previously described. Therefore, the pump pressure, at the surface would increase, would indicate that the crossover tool as in position as seen in FIGS. 1A through 1G should be raised by raising the wash pipe 44 in the hole, to the position that the first top seal ring 60 would be pulled from the position within the bottom seal bore 40, as seen more clearly in FIGS. 2D and 2E, and in position adjacent production screen 32 and through ports 45 in spacer 59. When this is accomplished in the process, the circulation through the production screen 32 would then be permitted through the port 33B below the first top seal ring 60, allowing the flow to enter into the wash pipe in the direction of Arrows 23.

As in the earlier part of the process during lower circulation, when the sand has begun to accumulate against the production screen 32, again the pump pressure will increase which will force the sand slurry into the casing perforations 35, and then into the formation 104, surround the casing at the point of the perforations. The pressure would then be released and the crossover tool would then be raised until the crossover ports are above the packer. In this position, the excess sand slurry can then be circulated and returned back to the well surface by pumping down the annulus between the casing 36 and the tubing that extends to the surface of the well above the hydraulic setting tool and crossover tool. The fluid would then be received at the surface of the well through the tubing bore.

Upon the completion of the reverse circulation as seen and described, again reference is made to FIGS. 2D–2G where it is illustrated that the crossover tool and the wash pipe 44 are raised until the shear joint 56 positioned above the collet 57 is stopped in the top locator 24. At this point, shear screws 56A in the shear joint 56 will be sheared off, leaving the disc valve assembly, comprising the components below the shear joint 56 down to the disc valve 10 held in place by lower end piece 18 of the assembly. In this position, the second bottom seal ring 62 together with disc valve 10 provide a means to prevent fluid flow from entering into the formation from above the disc valve 10, or from preventing fluid or gas production to enter from the surrounding formation. At the point that the shear pins are sheared, the crossover tool and the wash pipe are then withdrawn from the hole, leaving the disc valve assembly as described. Although a shear joint is utilized in this preferred embodiment, any means for disconnecting the disc valve assembly from the washpipe 44.

Figure 3:
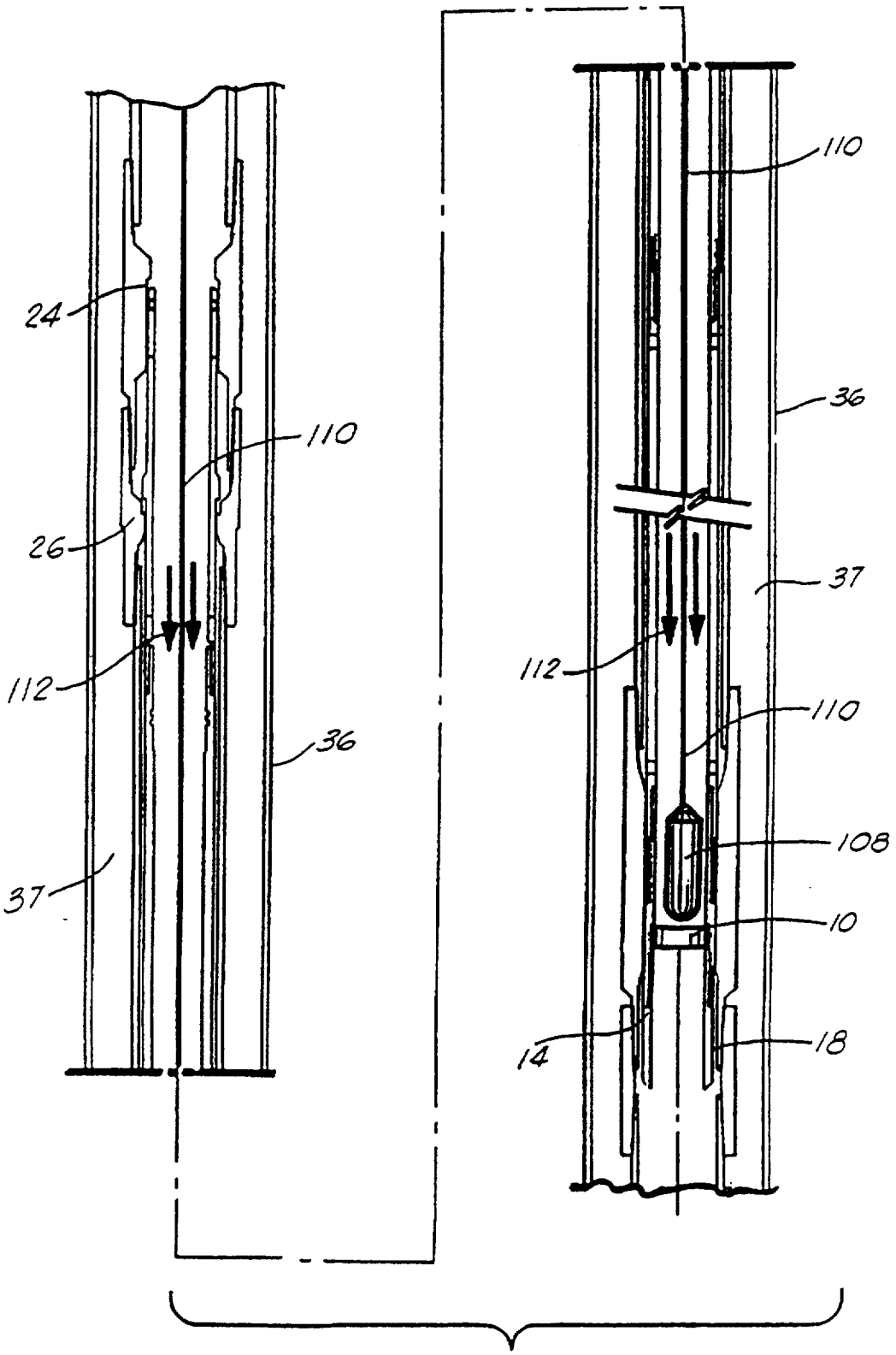
FIG. 3 illustrates a cross-sectional view of the manner in which the travelling disc valve of the present invention is ruptured and removed to allow flow as illustrated in FIGS. 4A and 4B.
Figure 4A:
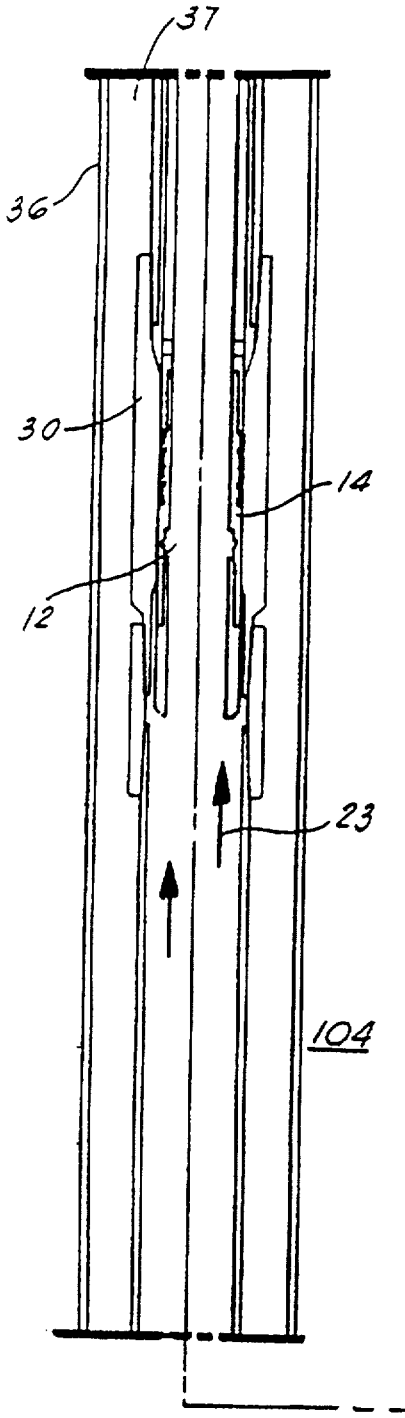
FIGS. 4A and 4B illustrate cross-section views of isolated components of the system utilizing the present invention, with the disc valve ruptured to allow production flow in the system.
Figure 4B:
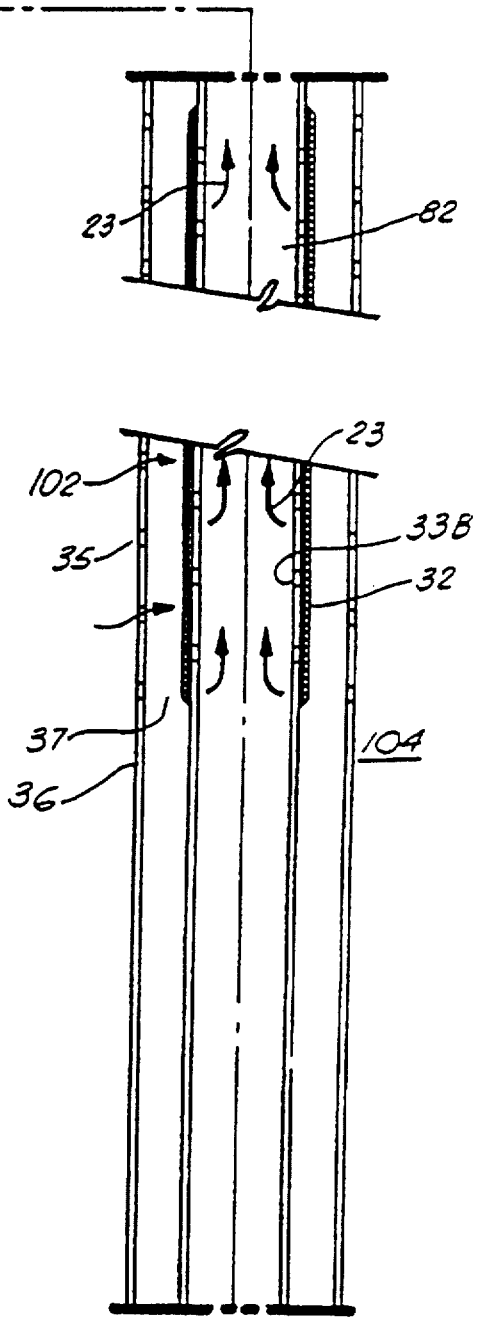

Following the running of the production tubing and the seals into the well and stabbing to secure the packer, the disc valve 10 must be ruptured in order to clear the way for production of the well. Therefore, there is a means to rupture the valve. This means would comprise, preferably, a long, slender, pointed sinker bar 108, as illustrated in FIG. 3, which would be lowered on a wire line 110 through bore 43 in the assembly 102, in the direction of Arrows 112, and by raising the dropping the bar 108 against the glass disc 10, the impact would rupture the disc 10, thus clearing the passage within the assembly 102, in order to allow the well to begin producing through the production screen through the internal bore of the disc valve assembly 102, as seen in FIGS. 4A–4B. In addition, mere fluid pressure in the bore may be used to rupture the disc valve, without the need for a sinker bar or the like.

As seen in those FIGS. 4A and 4B illustrate isolated views of the component of the travelling disc valve assembly 102, which illustrates the upper portion of the assembly having the gap 12 where the ruptured disc was once in position, and has been ruptured by the impact of tool 108, as illustrated in FIG. 3. Therefore, as seen, fluid which has traveled through ports 35 in casing 36 into the annular space 37 are then free to enter into production screen 32, through the ports 33B in the production casing, of the concentric passage 82 in the direction of Arrows 23 to be collected at the surface of the assembly. It is this particular point that the production of the well has commenced, and the upward pressure of the production from the surrounding formation 104 is able to take place.

List of Parts and Reference Numbers travelling disc valve 10
groove 12
circular end piece 18
collet 14
upper packer extension 20
sump packer 20
top locator 24
collet locator 26
elongated spacer 28
top seal bore member 30
production screen 32
outer screen layer 33
screen support wall 33A
plurality of ports 33B
casing perforations 35
production casing 36
annulus 37
string 11
bottom seal bore 40
lower end 41 telltale screen 44
bottom locator 50
outer production assembly 100
internal bore 54
traveling disc valve assembly 102
wash pipe 58
shear joint 56
shear screws 56A
collet 57
space 59
first top seal ring 60
outer wall 63
bottom seal bore member 61
bottom seal rings 62
casing annulus 37
arrows 21
ports 80
bore 43
concentric passage 82
ports 61
formation 104
wireline 110
bar 108
arrows 112
crossover assembly 114
compset packer 116
perforated extension 118
seal bore 120
indicator collet 122
no-go housing 124
seal bore 126

Because many varying and different embodiments may be made within the space of the inventive concept herein taught, and because many modifications may be made in the embodiment herein detailed in accordance with the descriptive requirement of the law, it is to be understood that the details herein are to be interpreted as illustrative and not in a limiting sense.

What is claimed as the invention is:

1. A travelling disc valve assembly, comprising:

a) a length of tubing lowered down a cased wellbore;

b) a crossover tool secured to the lower end of the length of tubing;

c) a disc valve assembly secured to the crossover tool and positioned to a lower circulation position in the well bore, said assembly further comprising a disc valve secured in a bore of the assembly;

d) means interconnecting the crossover tool with the disc valve assembly;

e) means in the upper portion of the disc valve assembly for disconnecting the disc valve assembly, from the crossover tool when the disc valve assembly is an upper position, providing means to prevent fluid from flowing into the formation below the disc valve and to prevent production flow to the surface; and f) means to rupture the disc valve so that the production within the formation is allowed to flow through the assembly bore to the surface.

2. The disc valve assembly in claim 1, wherein the assembly is positioned below the packer extension in the well bore.

3. The disc valve assembly in claim 1, wherein there is further provided a telltale screen for allowing initial circulation of gravel pack slurry.

4. The disc valve assembly in claim 1, wherein there is further provided a production screen for allowing production to flow into the assembly during recovery of hydrocarbons from the formation.

5. The disc valve assembly in claim 1, wherein the crossover tool and the wash pipe are raised until a top seal ring is retrieved from a bottom seal bore to permit circulation through the production screen.

6. The disc valve assembly in claim 1, wherein the means for shearing the crossover tool from the disc valve assembly further comprises a shear joint above a collet, wherein shear screws in the shear joint shear maintaining the disc valve assembly locked in position so that the disc valve may seal against upward or downward flow in the bore of the assembly.

7. A valve assembly positionable in a wellbore to prevent flow of fluids above or below the position of the valve, comprising:

a) an assembly means positioned without a cased borehole, extending from a length of wash pipe, the assembly means having a continuous bore therethrough;

b) substantially circular, rupturable valving member secured within the bore of the assembly means, and lowered to a first position adjacent a telltale screen;

c) a crossover tool and wash pipe positioned between the lower end of the tubing string and the assembly means;

d) means for moving the assembly means to a second position until ports in the crossover tool are positioned above a packer, so that sand slurry may be circulated back to the well surface;

e) a joint positioned between the wash pipe and the assembly means, for defining a means to disconnect the connection between the wash pipe and the assembly means, when the wash pipe is raised so that the assembly means, together with the disc valveing member is secured in place with the bottom seal rings and the disc valve member further defining a barrier for preventing fluid flow into the formation below the valve member and for preventing hydrocarbon flow from the formation to a point above the valving member; and f) means, after the valving member is in position, to rupture the valving member for allowing the hydrocarbon flow from the formation to flow up to the surface during production.

8. The valve assembly in claim 7, wherein the valving member is preferably a glass disc.

9. The valve assembly in claim 7, wherein there is further comprises bottom seal rings and top seal rings for sealing against fluid flow during the operation of the assembly.

10. The valve assembly in claim 9, wherein the bottom seal rings against in sealing against fluid flow after the valve assembly has been sheared from the crossover tool.

11. The valve assembly in claim 7, wherein the crossover tool and wash pipe are withdrawn from the wellbore after the valve assembly has been sheared therefrom.

12. The valve assembly in claim 7, wherein the means to rupture the valving member is a tool lowered into the hole.

13. The valve assembly in claim 7, wherein the means to rupture the valve member is fluid pressure.

14. The valve assembly in claim 7, wherein the joint to disconnect the assembly means comprises a shear joint.

15. A travelling disc valve assembly, comprising:

a) a continuous casing within a wellbore, the, casing having a plurality of perforations in the wall for allowing formation flow thereinto;

b) a tubing string lowered into the casing, including a packer assembly and at least having a production screen and a telltale screen along its length;

c) a travelling disc valve assembly positioned within the production casing, further comprising:

i) an upper length of wash pipe;

ii) a crossover tool engaged to an upper end of the length of wash pipe;

iii) a travelling disc valve assembly, including a rupturable disc valve locked in the assembly bore, top and bottom seal rings, and a shear joint between the disc valve assembly and the wash pipe;

d) means for positioning the disc valve at the position of the telltale screen for allowing circulation through the assembly bore to the surface;

e) means for positioning the disc valve at a second position between the production screen and the telltale screen for allowing fluid flow through the production screen;

f) means for disconnecting the disc valve assembly from the wash pipe after the disc valve has been moved to a position above the production screen and locking the valve in place; and g) means for rupturing the disc valve to allow fluid to flow from the formation through the production screen and up to the surface through the bore in the assembly;

*16. A traveling valve assembly, comprising:*

*a) a length of tubing lowered down a cased wellbore;*

*b) a crossover tool secured to the lower end of the length of tubing;*

*c) valving means secured to the crossover tool and positioned to a lower circulation position in the well bore;*

*d) means interconnecting the crossover tool with the valving means; and*

*e) means in the upper portion of the valving means for disconnecting the valving means from the crossover tool when the valving means is an upper position, providing means to prevent fluid from flowing into the formation below the valving means and to prevent production flow to the surface.*

*17. The valve assembly in claim 16, further comprising means to open the valving means so that the production within the formation is allowed to flow through the valving means to the surface.*

*18. The valve assembly in claim 16 wherein the valving means is a rupturable disc valve member.*

*19. A valve assembly, comprising:*

*a) a length of tubing lowered down a cased wellbore;*

*b) a crossover tool secured to the lower end of the length of tubing;*

*c) a valving assembly secured to the crossover tool and positioned to a lower circulation position in the well bore and including a bore through the assembly;*

*d) means interconnecting the crossover tool with the valving assembly;*

*e) means in the upper portion of the valving assembly for disconnecting the valving assembly from the crossover tool when the valving assembly is an upper position, further providing means to prevent fluid from flowing into the formation below the valving assembly and to prevent production flow to the surface; and*

*f) means to open a valve in the valving assembly so that the production within the formation is allowed to flow through the valving assembly to the surface.*

*20. The valve assembly in claim 19, wherein the valving means is a rupturable disc valve member.*

* * * * *